United States Patent
Godbillon et al.

(10) Patent No.: US 8,820,991 B2
(45) Date of Patent: Sep. 2, 2014

(54) LIGHTING OR SIGNALLING DEVICE WITH OPTICAL GUIDE FOR MOTOR VEHICLES

(75) Inventors: Vincent Godbillon, Paris (FR); Fabrice Mairet, Bois le Roi (FR); Fabien Sergent, Saint Cyr l'Ecole (FR)

(73) Assignee: Valeo Vision, Bobigny (FR)

( * ) Notice: Subject to any disclaimer, the term of this patent is extended or adjusted under 35 U.S.C. 154(b) by 289 days.

(21) Appl. No.: 13/345,944

(22) Filed: Jan. 9, 2012

(65) Prior Publication Data

US 2012/0224385 A1    Sep. 6, 2012

(30) Foreign Application Priority Data

Jan. 14, 2011    (FR) ...................................... 11 50335

(51) Int. Cl.
| | | |
|---|---|---|
| *F21V 9/00* | (2006.01) | |
| *F21S 8/10* | (2006.01) | |
| *F21W 101/12* | (2006.01) | |
| *F21W 101/14* | (2006.01) | |
| *F21Y 101/02* | (2006.01) | |

(52) U.S. Cl.
CPC ........... *F21S 48/2237* (2013.01); *F21S 48/215* (2013.01); *F21S 48/2268* (2013.01); *F21S 48/24* (2013.01); *F21W 2101/12* (2013.01); *F21W 2101/14* (2013.01); *F21Y 2101/02* (2013.01); *G02B 6/001* (2013.01)
USPC .......................................... 362/511; 362/520

(58) Field of Classification Search
CPC .................. B60Q 1/0011; B60Q 3/001–3/005; F21S 10/005; F21S 48/2225; F21S 48/2237; G02B 6/10; G02B 6/0055
USPC .......... 362/509, 511, 520, 522, 545, 551, 555
See application file for complete search history.

(56) References Cited

U.S. PATENT DOCUMENTS

| | | |
|---|---|---|
| 6,637,924 B2 | 10/2003 | Pelka et al. |
| 7,104,678 B2 | 9/2006 | De Lamberterie |
| 7,111,970 B2 | 9/2006 | Gasquet |
| 7,278,768 B2 | 10/2007 | Gasquet |
| 7,437,050 B2 | 10/2008 | Bourdin et al. |
| 7,726,854 B2 | 6/2010 | Bourdin et al. |
| 2002/0114168 A1 | 8/2002 | Pelka et al. |
| 2004/0136203 A1 | 7/2004 | Gasquet |
| 2004/0184286 A1 | 9/2004 | De Lamberterie |
| 2005/0276565 A1 | 12/2005 | Bourdin et al. |
| 2007/0008736 A1 | 1/2007 | Gasquet |
| 2007/0121334 A1 | 5/2007 | Bourdin et al. |
| 2010/0014309 A1 | 1/2010 | Heidinger |

FOREIGN PATENT DOCUMENTS

| | | |
|---|---|---|
| DE | 10311317 | 9/2004 |
| EP | 1434000 | 6/2004 |
| EP | 1443265 | 8/2004 |
| EP | 1605201 | 12/2005 |
| EP | 1775511 | 4/2007 |
| EP | 1903358 | 3/2008 |
| WO | WO0240917 | 5/2002 |

*Primary Examiner* — Jason Moon Han
(74) *Attorney, Agent, or Firm* — Jacox, Meckstroth & Jenkins (57) ABSTRACT

A lighting and/or signalling device for a motor vehicle comprising at least one light source (S) emitting a light beam and at least one optical guide (G) within which the light beam propagates, the optical guide comprising:
a first face forming an exit face (FS) for the light beam,
a second face forming a face (FR) for reflecting the light beam, and
a screen (ED) disposed facing the reflection face (FR) of the light guide (G) and comprising an orientation means redirecting light rays escaping from the guide at the reflection face, so as to return them, at least partially, into the guide, the orientation means comprising catadioptric reflecting patterns.

20 Claims, 6 Drawing Sheets

LIGHTING OR SIGNALLING DEVICE WITH OPTICAL GUIDE FOR MOTOR VEHICLES

CROSS-REFERENCE TO RELATED APPLICATIONS

This application claims priority to French Application No. 1150335 filed Jan. 14, 2011, which application is incorporated herein by reference and made a part hereof.

BACKGROUND OF THE INVENTION

1. Field of the Invention

The subject of the present invention is a lighting and/or signalling device for motor vehicles, comprising at least one optical guide capable of producing a scattering of the light over at least part of its length. The invention also relates to a vehicle comprising such a lighting or signalling device.

2. Description of the Related Art

In the field of lighting and of signalling for motor vehicles, the use of optical guides is becoming more widespread. An optical guide is, very schematically, an oblong element made of transparent material, generally in the form of a cylinder or of a flat slice. Near to one of the ends of the guide, referred to as the entry face of the guide, one (or more) light sources is disposed, for example a small light source of the light-emitting diode type: the light rays emitted by this source propagate by total internal reflection within the length of the guide in the direction of its opposite end, referred to as terminal face of the guide. A part of the light rays propagating within the guide will exit from it by the face referred to as front face of the guide due to the presence of reflecting elements disposed on the face referred to as back face of the guide, opposite to the preceding one. These reflecting elements are for example composed of prisms. The guide thus emits light over its whole length. They have the advantage of being able to take very varied geometric shapes, rectilinear or rounded, notably according to an arc of a circle, and provide a lighting surface even in regions that are virtually inaccessible to a headlamp or to a light of the vehicle. It thus contributes significantly to the style of the headlamp or of the light. However, the existing light guides are imperfect. Indeed, it is often difficult to ensure an identical level of illumination between the first and the second end of the guide, especially if it has a significant length, the level of Illumination tending to decrease with the distance from the entry face of the guide. Furthermore, it is also difficult to ensure a uniform aspect to the guide for any viewing angle with respect to the guide, the light exiting from the guide having an angular distribution that is often not broad enough. In fact, this is an important point depending on the disposition of the guide and its shape inside of the headlamp or of the light: the guide tends to be designed such that it mainly Illuminates along the axis of the vehicle in order to comply with photometric standards. However, it also turns out to be important to have a uniformly lit aspect that is also visually pleasing when the observer moves away from the longitudinal axis of the vehicle. It may also be desirable to improve the optical efficiency of the guide, because there can be leaks of light lost notably through the back face of the guide.

A solution already known from the Patent EP 1 443 265, which is equivalent to U.S. Patent Publication 2004/0184286 and U.S. Pat. No. 7,104,678, which are incorporated herein by reference and made a part hereof, is to associate with a light guide a reflector situated at the back of the light guide, in order to limit as far as possible the leaks of light and to thus improve the optical efficiency of the guide. The Patent application WO 02/40 917, which is equivalent to U.S. Patent Publication 2002/0114168 and U.S. Pat. No. 6,637,924, which are incorporated herein by reference and made a part hereof, discloses a vehicle signalling device in which a reflecting layer is disposed by bonding against a reflection face of an optical guide.

Finally, a solution is known from the document EP1775511, which is equivalent to U.S. Patent Publication 2007/0121334 and U.S. Pat. No. 7,726,854, which are incorporated herein by reference and made a part hereof, where a diffusing screen is disposed on the back of a light guide so that a part of the light rays escaping through the reflection face of the optical guide are at least partially returned into the guide.

These guides are generally used to produce a light function in an overall direction of light beam exiting from the lighting and/or signalling device. However, in this type of lighting and/or signalling device, few light rays reach the sides and the device appears to be extinguished.

SUMMARY OF THE INVENTION

The aim of the invention is to provide a lighting and/or signalling device that overcomes the aforementioned drawbacks and improves the lighting and/or signalling devices known from the prior art. In particular, the invention provides a lighting and/or signalling device having a simple and low-cost structure while at the same time allowing a uniformly lit aspect for the guide to be obtained, and especially over a wide range of viewing angles of incidence.

According to the invention, the lighting and/or signalling device for a motor vehicle comprises at least one light source emitting a light beam and at least one optical guide within which the light beam propagates, the optical guide comprising:
   a first face forming an exit face for the light beam;
   a second face forming a face for reflecting the light beam; and
   a screen disposed facing the reflection face of the light guide. The screen comprises an orientation means redirecting light rays escaping from the guide at the reflection face, so as to return them, at least partially, into the guide.

The term optical guide is understood to mean, in the present application, a transparent or translucent component inside of which light rays propagate from one of the ends of the guide, referred to as "entry face", as far as at least one exit face. Close to one of the ends of the guide, referred to as entry face of the guide, one (or more) light source is disposed, for example a small light source of the light-emitting diode type. The light rays emitted by this source propagate by total internal reflection within the length of the guide in the direction of its opposite end, referred to as terminal face of the guide. A part of the light rays propagating within the guide will exit from it via the face referred to as front face of the guide thanks to the presence of reflecting elements disposed on the face referred to as back face of the guide, opposite to the preceding one. These reflecting elements are composed for example of prisms. The guide thus emits light over its entire length. During the propagation within the guide, some light rays are reflected many times before exiting from the guide.

It was shown that, surprisingly, the presence of this orientation means had a significant impact on the lit aspect of the guide: it does in fact allow the light escaping from the guide via its back face to be recovered, and it to be returned, at least in part, into the guide. The advantageous result of this is to increase the optical efficiency of the guide.

Preferably, the orientation means comprises catadioptric reflecting patterns, the catadioptric patterns allowing the orientation of the light rays to be optimized so that they return into the optical guide.

Preferably, the means for orientating the light rays is arranged in such a manner as to return the light rays propagating in a particular given first direction, in a particular given second direction. It was also observed that the invention allowed the use of this type of linear light guide to perform a function of the lateral position indicator, or 'side marker', type.

Preferably, the orientation means comprises reflecting patterns. Such patterns constitute a simple solution for obtaining the orientation means.

The reflecting patterns could be obtained by deposition of a layer of reflecting material on patterns.

According to one preferred embodiment, the screen is formed in a transparent component, comprising a first face facing the light guide and a second face opposite to this first face, this second face comprising the reflecting patterns. The reflection by the latter thus takes place within the material of the screen. The reflecting patterns can thus be formed by a part of the interface forming the second face of the screen, by being configured in such a manner that the reflection towards the light guide occurs by total internal reflection on this interface. This obviates the need for a specific coating. The screen according to the invention can thus be a single block, the patterns being formed on its second face, namely that opposite to the face designed to be facing the entry face of the light guide. The patterns can be formed by molding, pressing or by machining.

Advantageously, the orientation means comprises catadioptric reflecting patterns. The catadioptric patterns allow the orientation of the light rays to be optimized so that they return into the optical guide.

The orientation means can comprise a spatial repetition of the reflecting patterns.

Preferably, the orientation means comprises prisms. These allow the light rays to be reoriented in a particular direction. With respect to a scattering screen, a returned light ray is not scattered. For example, the light rays escaping from the back face of the guide perpendicular to its general base surface, in other words the surface passing through the base of the prisms of the back face of the guide, are reoriented in a particular direction, notably in a direction forming the main axis for a secondary optical function of the lighting and/or signalling device.

Advantageously, the orientation means has a succession of catadioptric patterns formed on the front face of the screen facing the optical guide, the patterns being metalized.

One face of the screen and/or the second face of the guide and/or the first face of the guide can comprise a graining, this graining allowing light rays returned by the orientation means to be scattered. Thus, it is possible to recover the light escaping from the guide via its back face, and to return it, at least in part, into the guide with a high angular width, owing to the scattering nature of the graining. Consequently, the optical guide emits via its front face a more spread out light and with a more anisotropic direction: from wherever it is observed. The guide retains a fairly uniformly lit aspect.

Preferably, the lighting and/or signalling device is designed to provide a first optical function having a first main optical axis and to provide a second optical function having a second main optical axis and at least one portion of the orientation means is configured for orienting the light rays mainly along the second main optical axis.

Preferably, the lighting and/or signalling device comprises several optical guides, notably disposed at least substantially parallel to one another, each guide comprising a second face forming a reflection face for a light beam and a screen, preferably common, is positioned facing the second faces of the guides. This screen can comprise patterns between the guides for style or be designed for example to implement an additional optical function.

The reflection face can be equipped with reflecting prisms. In a known manner, indeed, the presence of these prisms allows a fraction of light rays over its length to be made to exit from the guide in a controlled manner: each light ray propagating within the guide and encountering the optically active region of these prisms is redirected outside of the guide via its front face.

Alternatively or in combination with the presence of prisms, the reflection face of the guide can be equipped with reflection foci for the light, notably in the form of depressions with respect to the furthermore substantially smooth surface of the face. These reflection foci can be obtained by surface alteration of the reflection face, and can be of similar design to that described in the Patent EP 1 434 000, which is equivalent to U.S. Patent Publications 2004/0136203 and 2007/0008736 and to U.S. Pat. Nos. 7,111,970 and 7,278,768, which are incorporated herein by reference and made a part hereof, for light guides more of the surface type rather than linear as in the present case.

Alternatively or in combination with the presence of prisms, the reflection face of the guide can be equipped with a graining.

The reflection face of the guide therefore comprises reflecting means, which are in fact decoupling means and which are independent of the screen, these decoupling means being indispensable for obtaining the desired photometry.

The screen can be fixed to or can form an integral part of a bezel of the device. A bezel behaves as a style component ensuring a surface continuity between, for example, a reflector and the edge of a housing or of the glass cover of the headlamp or of the light. The bezel can have various aspects, notably mat or, on the contrary, shiny and coming close to the aspect of a reflector. Integrating the screen according to the invention into a bezel associated with a reflector for a lighting or signalling main function is technically advantageous: no additional component is added, there is a gain in simplicity of assembly and in positioning tolerance between the components of the light or of the headlamp as a whole.

The screen can form an integral part of a bezel of the device, by local modification of the properties of the surface aspect of the bezel, notably by surface erosion, addition or elimination of a coating. It can for example be an aluminized bezel, one area of which is not coated with a layer of aluminum.

Advantageously, the lighting and/or signalling device comprises a housing closed by a sealing glass cover in which the at least one optical guide, the at least one light source and the screen are disposed, the orientation means having a succession of catadioptric patterns formed on the front face of the screen facing the optical guide, the patterns being metalized, and the screen being formed directly by the internal surface of the housing of the lighting and/or signalling device, for example by pressing, machining or during the molding of the housing.

The screen is advantageously disposed at a distance of at least 0.5 mm from the reflection face of the guide, notably at a distance in the range between 1 and 15 mm, in particular at a distance in the range between 2 and 10 mm. It is advantageous for the screen not to be too close or even in direct contact with the guide.

The screen thus receives light rays exiting from the guide via the reflection face of the guide and redirects them towards the reflection face.

The invention tries to "recover" light rays that would otherwise be lost, without substantially modifying and without degrading the photometric performance parameters of the other light rays propagating within the guide.

The invention also relates to a motor vehicle comprising a lighting and/or signalling device as previously defined.

A further subject of the invention is a screen such as previously described.

These and other objects and advantages of the invention will be apparent from the following description, the accompanying drawings and the appended claims.

The invention is described in detail with the aid of several non-limiting exemplary embodiments, illustrated by the following figures:

DETAILED DESCRIPTION OF THE PREFERRED EMBODIMENTS

All figures are very schematic and, in order to facilitate their reading, are not necessarily to scale.

Figure 17:
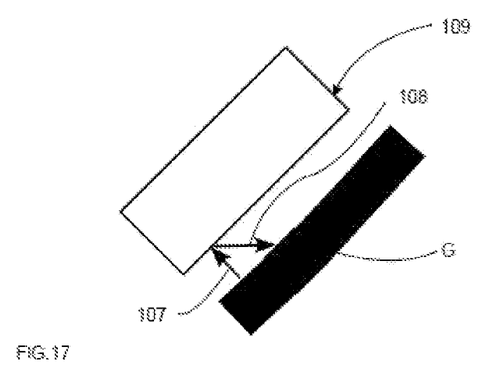
FIG. 17 shows the principle of operation of the invention.

Such as shown in FIG. 17, according to the invention, means 109 for orienting light rays is arranged in such a manner as to return a light ray propagating in a given first direction 107 from the guide, in a given second direction 108 towards the guide. For this purpose, the orientation means can comprise reflecting elements.

The optical functions can be signalling functions or functions for lighting the road.

Figure 1:
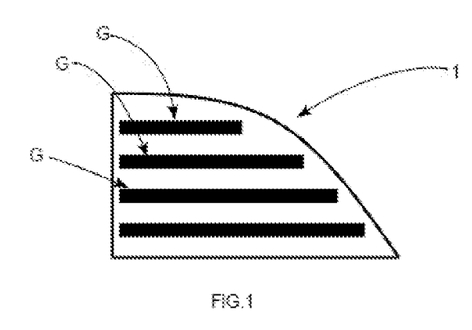
FIG. 1 is a front face view of one embodiment of a signalling device for motor vehicles according to the invention.
Figure 2:
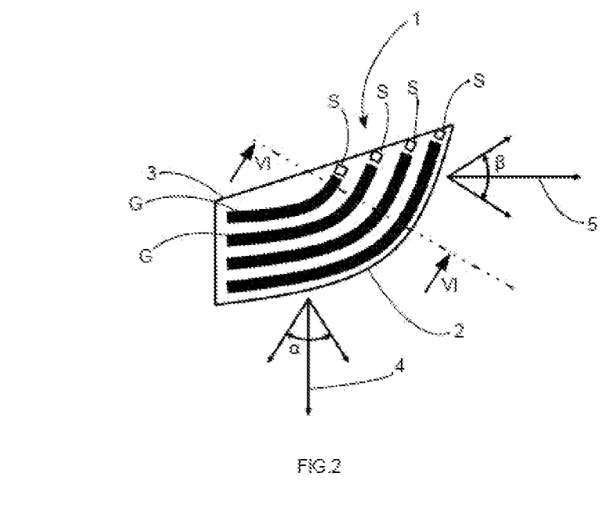
FIG. 2 is a top view of this embodiment of a signalling device for motor vehicles according to the invention.
Figure 6:
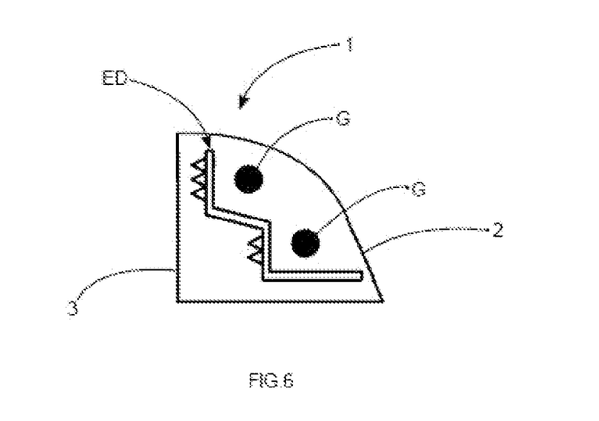
FIG. 6 shows a transverse section of the embodiment of a signalling device for motor vehicles according to the invention.

One embodiment of a lighting and/or signalling device 1 according to the invention is described hereinafter with reference to FIGS. 1, 2 and 6. The device 1 mainly comprises a housing 3 closed by a sealing glass cover 2 and in which one or more light guides or optical guides G are disposed associated with one or more light sources S and associated with one or more screens ED.

For example, the device 1 is designed to provide a first optical function having a first main optical axis 4 and to provide a second optical function having a second main optical axis 5. The first optical function imposes an emission of light in the main direction 4 and a spreading out of the emission of light around this axis, for example a horizontal spreading a typically of around 20° for an optical function of the position light signalling type. Regarding the second optical function, this imposes an emission of light along the second main direction 5 and a spreading out of the emission of light around this axis, for example a horizontal spreading β typically of around 45° or an optical function of the side marker type. The angle separating the first and second main directions can reach 90°. These optical functions are provided by the light rays escaping from the exit faces of the optical guides.

Alternatively, the device 1 is designed to provide an optical function requiring, on the one hand, an emission of light in a main direction 4 along the longitudinal axis of the vehicle and having, on the other hand, a spreading out of the light emission extending from this axis 4 up to a second optical axis 5. This allows the optical function to be seen by an observer situated on the side of the vehicle.

Figure 3:
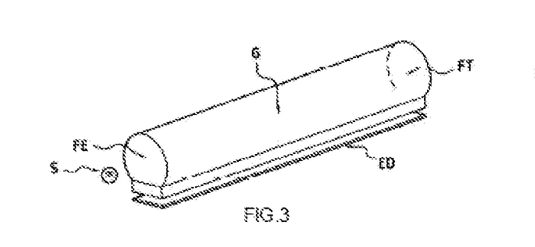
FIG. 3 shows a perspective view of an optical guide according to the invention designed to be incorporated into a motor vehicle light.
Figure 4:
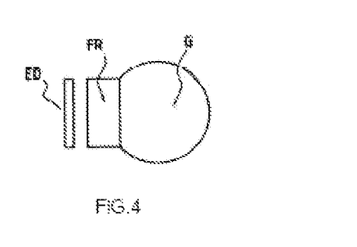
FIG. 4 shows a transverse section of the guide according to FIG. 3.
Figure 5:
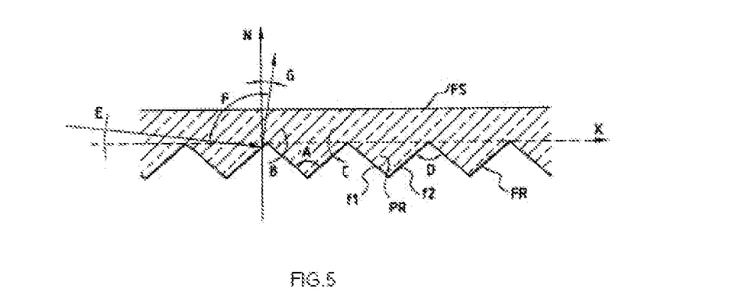
FIG. 5 shows a longitudinal section of the guide.

FIGS. 3 and 4 show perspective and cross-sectional views of an optical guide G designed to propagate a light beam emitted by a light source S. The optical guide G, in this example, is rectilinear, and the sources are preferably placed at the end of the guides on the wing return in the case of a device with a wing return. The sources are preferably masked by means of an opaque shield so as not to be visible from the outside.

It goes without saying that the optical guide G can take other forms such as, for example, comprising rounded sections, one or more sections of a circular arc, etc. The invention is also applicable in the same way to these curved guides.

In this embodiment, the optical guide G has a circular cross-section; it will of course be understood that it may also, in other embodiments, have a cross-section that is elliptical, square, oval, etc.

In this embodiment, the optical guide G is a transparent polymer made of polycarbonate or PMMA (polymethylmethacrylate), preferably of crystalline quality.

This optical guide has a face referred to as entry face FE at one of its ends, in front of which a light-emitting diode S is disposed, and a terminal end FT, which forms the end opposite to the preceding end and which does not have a light source.

Optionally, a second light source may be provided at each of the ends of the guide. The guide furthermore comprises two main faces oriented along its length:
  a first face FS forming an exit face for the light rays propagated within the optical guide G; this exit face FS may be smooth and continuous, or else comprise striations; and
  a second face FR, opposite to the first face FS, forming a reflection face of the optical guide G, hence which is equipped with reflecting elements.

According to a first variant, as shown in FIG. 3, these are composed of a succession of prisms PR. These prisms PR are placed side by side and ensure that the light rays are reflected which have a non-zero angle of incidence with the axis X longitudinal to the optical guide G. Each prism has a substantially triangular shape; each prism comprises a base, a facet f1 and a facet f2, being planar and non-parallel, and an apex A. Here, they are symmetrical with respect to the normal N to the axis X of the optical guide, in other words they have identical dimensions and angles B and C, on either side of their bisector. They may also be asymmetric, in other words having dimensions and/or angles B and C that are different; this is then referred to as an optical guide with dissymmetric prisms. Examples of non-symmetrical prisms will notably be found in the European Patent application EP 05291258.1 filed on Jun. 10, 2005, whose publication number is EP 1 605 201, which is equivalent to U.S. Patent Publication 2005/0276565 and to U.S. Pat. No. 7,437,050, all of which are incorporated herein by reference and made a part hereof.

According to a second variant (potentially combined with the first), the reflecting elements are in the form of reflecting dimples: spherical depressions regularly distributed over the surface of the face FR, notably during the molding of the component forming the guide G. For their dimensioning and their distribution, reference may notably be made to the description of the surface reflecting foci described in the Patent EP 1 434 000, which is equivalent to U.S. Patent Publications 2004/0136203 and 2007/0008736 and to U.S. Pat. Nos. 7,111,970 and 7,278,768, all of which are incorporated herein by reference and made a part hereof.

According to the invention, a screen ED is associated with this guide. This screen is disposed in front of the face FR of the guide. It can be substantially planar, notably locally. According to the first variant, the apices of the prisms PR of the reflection face FR pass through a plane parallel to the plane of the screen. Preferably, as Illustrated here, the dimensions of the screen are sufficiently large and the distance between guide and screen is chosen such that all or the majority of light rays escaping via the reflection face of the guide are collected by the screen. The distance between the screen and the plane passing through the apices of the prisms of the guide is chosen here to be around 1 mm. This distance may vary slightly over the length of the guide without any significant loss of the advantage provided by the invention. It is just preferred that a direct contact between the guide and the screen be avoided. As shown in FIG. 6, a screen ED can be common to several optical guides, notably the screen can run between optical guides.

Figure 7:
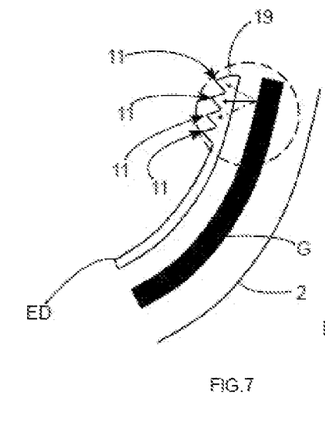
FIGS. 7 to 9 are schematic views of the guide, of the screen and of light rays allowing the tracks of the light rays to be illustrated.
Figure 8:
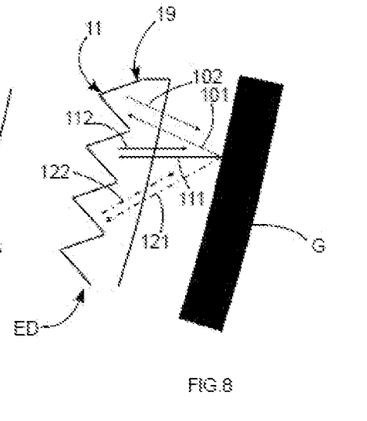
Figure 9:
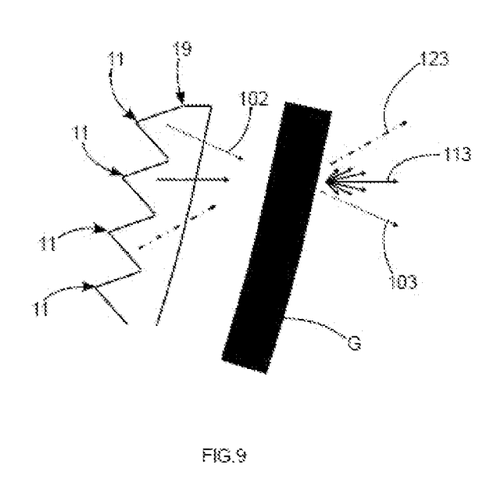

As shown in FIGS. 7 to 9, the screen has an orientation means. This orientation means allows the rays of the light beam having escaped from the guide at the reflection face to be redirected so as to return as many of them as possible into the guide. This allows the optical efficiency of the device to be improved. In the case where a screen ED is common to several optical guides, the orientation means can nevertheless only be provided facing the reflection faces of the guides.

These light rays are subsequently returned into the guide passing once again through the reflection face of the guide. Once they have re-entered the guide, these light rays will either continue on their propagation path within the guide, or leave it via the exit face FS being added to the other exiting light rays. Overall, all the light rays leaving via the exit face will therefore be of higher intensity.

The orientation means 19 comprises for example reflecting patterns 11, notably catadioptric patterns. These patterns are for example formed on the screen with a material transparent to visible radiation. The patterns are formed on the back face of the screen. The light rays therefore pass through the screen before being returned by the patterns. These patterns are for example spatially repeated over surfaces of the screen facing reflecting faces of the optical guides.

According to a first variant, the exit face FS of the optical guide is smooth. According to a second variant, not shown, it has a striated profile, as is for example described in the aforementioned European Patent application. These striations allow the orientation to be modified, to "straighten up" the light rays at the exit of the optical guide, in other words to make them exit from the optical guide with a negative angle with respect to the normal N to the axis X of the guide.

These striations may be of various shapes, for example, in the form of prisms or of domes or else a combination of prisms and domes.

When the variant where the exit face is equipped with striations is chosen, each striation on the exit face FS is preferably situated facing a prism PR (or other reflecting element) on the reflection face FR.

FIGS. 7 to 9 detail the tracks of some light rays within the device in order to clarify the mode of operation of the guide in association with the screen. Three light rays 101, 111 and 121 escape from the guide at the reflection face of the guide owing to imperfections of this face, notably imperfections of connection between the facets of the prisms. The various light rays penetrate into the screen and are reflected by the catadioptric patterns 11 of the orientation means. The light rays reflected are respectively referenced 102, 112 and 122 and are reflected in directions parallel, or substantially parallel, to those of the light rays 101, 111 and 121. The light rays therefore re-enter the optical guide and traverse it to re-emerge through the exit face. The light rays refracted by the guide are respectively references 103, 113 and 123. These light rays can be redirected by the prisms on the reflection face. In this variant embodiment, the orientation means therefore allow the light rays to be redirected in such a manner that they leave the screen in the direction from which they came or substantially in this direction. It should be noted that, owing to the size of the catadioptric patterns, the light rays 101 and 102, 111 and 112, 121 and 122 are parallels but not coincident, the interval of the distances separating them being a function of the size of the catadioptric patterns.

Of course, it is a schematic view of the path of the light rays that has been described.

The light rays exiting from the face FS of the guide are thus the addition of the light rays exiting directly from the guide and of those that have been returned into the guide by the screen. This addition leads to exit angles for the light rays emitted by the face FS of significantly broader angular amplitude. The light guide preserves its lit aspect even at high angle of incidence with respect to the normal to the guide G. The function fulfilled by the guide, notably the signalling function of the position light type, is accordingly better fulfilled, and the aesthetic appearance of the guide in the lit state is improved.

Figures 10, 12:
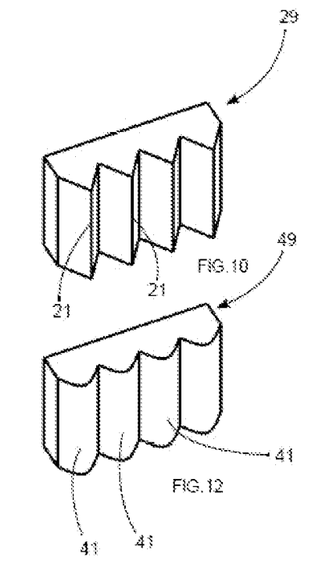
FIGS. 10 to 13 show several variant embodiments of the means for orienting the light rays.

In a second variant of lighting and/or signalling device, the orientation means 29 shown in FIG. 10 has a structure different from the first variant in FIGS. 7 to 9. It has a succession of prismatic striations 21 on the back face of the screen.

Figures 11, 13:
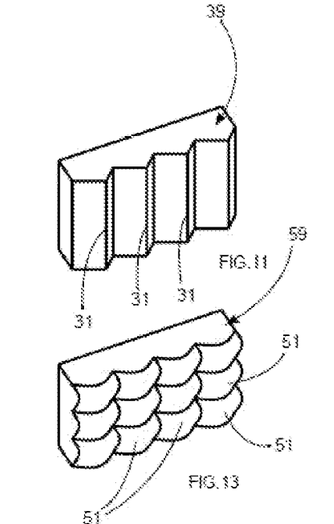

In a third variant of the lighting and/or signalling device, the orientation means 39 shown in FIG. 11 has a different structure. It has a succession of asymmetric prismatic striations 31 on the back face of the screen. This structure allows a direction defined by the asymmetry of the striations to be favored.

In a fourth variant of the lighting and/or signalling device, the orientation means 49 shown in FIG. 12 has a different structure. It has a succession of cylindrical striations 41 on the back face of the screen.

In a fifth variant of the lighting and/or signalling device, the orientation means 59 shown in FIG. 13 has a different structure. It has a spatial repetition of toroidal patterns 51 on the back face of the screen.

Figure 14:
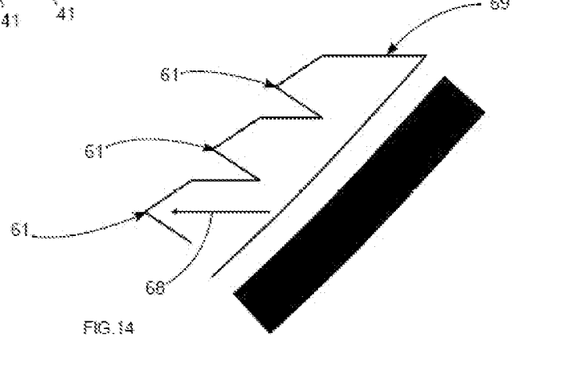
FIGS. 14 to 16 show other further variant embodiments of the means for orienting the light rays.

In a sixth variant of the lighting and/or signalling device, the orientation means 69 shown in FIG. 14 has a different structure. On the back face of the screen, it has a succession of catadioptric patterns 61 formed by trihedral structures whose perpendicular bisectors run along an axis 68 non-parallel to the normal to the base surface of the reflection face of the optical guide. This structure allows a direction defined by the axis 68 to be favored, in other words the return of the light rays in this direction to be favored. Indeed, the efficiency of the catadioptric patterns decreases as the direction moves away from this direction. The direction defined by the axis 68 is preferably coincident with the direction of the main axis of the second optical function.

Figure 15:
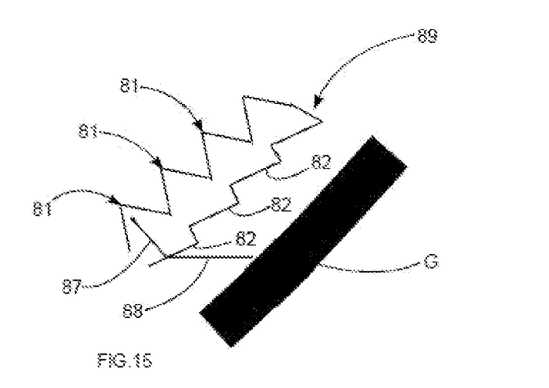

In a seventh variant of the lighting and/or signalling device, the orientation means 89 shown in FIG. 15 has a different structure. On the back face of the screen, it has a succession of catadioptric patterns 81 associated with prisms 82 formed on the front face of the screen. This structure allows a direction defined by the axis 88 non-parallel to the normal to the base surface of the reflection face of the optical guide to be favored, in other words the return of the light rays in this direction is favored. Indeed, the efficiency of the catadioptric patterns decreases as the direction moves away from the direction 87 (defined as the perpendicular bisector of the trihedral structures forming the catadioptric patterns), this direction 87 being redirected along the axis 88 by the action of the prisms 82. The direction defined by the axis 88 is preferably coincident with the direction of the main axis of the second optical function.

According to the invention, when the guide is sufficiently rounded, the average direction of the light rays escaping from the guide can be virtually perpendicular to the longitudinal direction of the vehicle, in particular over the part of the guide running along the side of the vehicle. In this case, a catadioptric system whose perpendicular bisector is oriented approximately perpendicularly to the general face of the guide allows the light rays with an average direction also virtually perpendicular to the longitudinal direction of the vehicle to be returned into the guide. This allows the guide to be seen as lit even for an observer situated on the side of the vehicle. On the other hand, if the guide is not sufficiently rounded, a catadioptric system thus configured will return the light rays with an average direction making too small an angle with the longitudinal axis of the vehicle. An observer situated on the side of the vehicle will see the guide as extinguished. An average direction of light rays is understood to mean the direction corresponding to the axis of a cone within which a set of light rays is propagating. This average direction is also called overall direction.

The catadioptric systems on the screen of the sixth variant and the prisms on the screen of the seventh variant of the invention allow an average direction to be given to the light rays redirected into the guide different from the average direction of the light rays escaping from the guide. These catadioptric systems and their prisms can thus be configured in such a manner that, for a given average direction of the escaping light rays, the light rays are returned in an average direction approximately perpendicular to the longitudinal axis of the vehicle. Thus, the optical guide is visible for an observer situated on the side of the vehicle, even when the guide is not very rounded.

Figure 16:
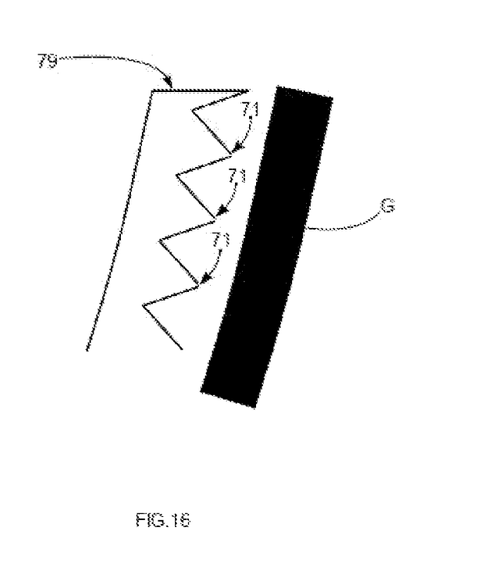

In an eighth variant of the lighting and/or signalling device, the orientation means 79 shown in FIG. 16 has a different structure. It has a succession of catadioptric patterns 71 formed on the front face of the screen, in other words on the face of the screen facing the optical guide. A metallization of the patterns is therefore necessary. This is not a problem because, in many applications, this screen can be formed within a bezel forming a reflector and requiring a metallization over all or part of its surface.

Furthermore, this screen can be formed directly by the internal surface of the housing of the lighting and/or signalling device, for example by pressing, machining or during the molding of the housing.

In one embodiment, not shown in the figures for the sake of simplification, the lighting or signalling device of the invention comprises at least two light sources each placed at one end of the optical guide. The optical guide can thus propagate light rays from both ends of the optical guide, which then allows the length of the optical guide to be increased.

In another embodiment of the invention, the lighting or signalling device comprises several optical guides, notably placed at least substantially parallel to one another or placed so as to have at least one common intersection. In the latter case, a light source can be placed at this point of intersection in such a manner as to emit light beams into each of the optical guides.

Preferably, in the various embodiments and in the various variant embodiments of the device, one face of the screen and/or the second face of the guide and/or the first face of the guide comprises a graining, this graining allowing light rays returned by the orientation means to be scattered. Thus, the light rays are returned in a scattered fashion, notably according to a Lambertien distribution. Owing to the broader angular distribution, more spread out, the device, in particular the guides, present a more uniform aspect whatever the angle of view. This effect of scattering is notably shown in FIG. 9 by the light rays 113. It notably allows the regulatory photometric grids around the main axes of the optical functions to be filled.

In various variant embodiments, it should be noted that the return of the light rays is favored in a certain particular direction. In the case where the lighting and/or signalling device provides a single optical function, it is advantageous to move this particular direction away from the main axis of the optical function so that this optical function is also visible on the side of the vehicle. In the case where the lighting and/or signalling device provides two optical functions, it is advantageous to make this particular direction and the main axis of the optical function, which must be favored, coincide. For example, in the case where the lighting and/or signalling device provides a position light function and a side marker optical function whose first and second main directions reach 90° and in the case where the curvature of the light guides is not very pronounced such that the light guides are not very visible along the main axis of the side marker optical function, it is advantageous to make the particular direction and the main direction of the side marker optical function coincide. Generally speaking, in the case where the lighting and/or signalling device provides two optical functions, a screen can be provided having at least one first orientation means favoring the return in a first direction parallel or substantially parallel to the axis of the first optical function and at least one second orientation means favoring the return in a second direction parallel or substantially parallel to the axis of the second optical function. In this case, the extent of the first and second orientation means are determined so as to allow the regulatory photometric grids to be filled taking into account cost constraints or aesthetic constraints.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A lighting and/or signalling device for a motor vehicle comprising at least one light source (S) emitting a light beam for the motor vehicle and at least one optical guide (G) within which said light beam propagates, said at least one optical guide comprising:
a first face forming an exit face (FS) for said light beam;
a second face forming a reflection face (FR) for reflecting said light beam; and
a screen (ED) disposed facing said reflection face (FR) of said at least one optical guide (G), said screen (ED) comprising orientation means for redirecting light rays escaping from said at least one optical guide at said reflection face, so as to return them, at least partially, into said at least one optical guide;
wherein said orientation means comprises catadioptric reflecting patterns.

2. The lighting and/or signalling device according to claim 1, wherein said orientation means for the light rays is arranged in such a manner as to return a light ray propagating in a given first direction, in a given second direction.

3. The lighting and/or signalling device according to claim 1, wherein said orientation means comprises reflecting patterns.

4. The lighting and/or signalling device according to claim 1, wherein said orientation means comprises a spatial repetition of the reflecting patterns.

5. The lighting and/or signalling device according to claim 1, wherein said reflecting patterns are obtained by deposition of a layer of reflecting material on patterns.

6. The lighting and/or signalling device according to claim 1, wherein said orientation means comprises prisms.

7. The lighting and/or signalling device according to claim 1, wherein said orientation means has a succession of catadioptric patterns formed on a front face of said screen facing said at least one optical guide (G), said catadioptric patterns being metalized.

8. The lighting and/or signalling device according to claim 1, wherein a face of the screen and/or the second face of said at least one optical guide and/or the first face of the guide comprises a graining, this graining allowing light rays returned by the orientation means to be scattered.

9. The lighting and/or signalling device according to claim 1, wherein it is designed to provide a first optical function having a first main optical axis and to provide a second optical function having a second main optical axis and in that at least one portion of the orientation means is configured for orienting the light rays mainly along the second main optical axis.

10. The lighting and/or signalling device according to claim 9, wherein said reflection face (FR) is equipped with reflecting prisms (PR).

11. The lighting and/or signalling device according to claim 1, wherein said screen (ED) is fixed to or forms an integral part of a bezel of the device.

12. The lighting and/or signalling device according to claim 1, wherein said screen (ED) forms an integral part of a bezel of the device, by local modification of the properties of the surface aspect of said bezel, notably by surface erosion, addition or elimination of a coating.

13. The lighting and/or signalling device according to claim 1, wherein it comprises a housing closed by a sealing glass cover within which said at least one optical guide (G), said at least one light source (S) and said screen (ED) are disposed and in that the orientation means has a succession of catadioptric patterns formed on the front face of the screen facing said at least one optical guide (G), the patterns being metalized, and said screen (ED) being formed directly by the internal surface of the housing of the lighting and/or signalling device.

14. The lighting and/or signalling device according to claim 1, wherein said screen (ED) is disposed at a distance of at least 0.5 mm from said reflection face (FR) of said at least one optical guide, notably at a distance in the range between 1 and 15 mm, in particular a distance in the range between 2 and 10 mm.

15. The lighting and/or signalling device according to claim 1, wherein said screen (ED) receives light rays exiting from said at least one optical guide (G) via said reflection face (FR) of said at least one optical guide and redirects them towards said reflection face (FR).

16. A lighting and/or signalling device for a motor vehicle comprising at least one light source (S) emitting a light beam for the motor vehicle and at least one optical guide (G) within which said light beam propagates, said at least one optical guide comprising:
a first face forming an exit face (FS) for said light beam;
a second face forming a reflection face (FR) for reflecting said light beam; and
a screen (ED) disposed facing said reflection face (FR) of said at least one optical guide (G), said screen (ED) comprising orientation device for redirecting light rays escaping from said at least one optical guide at said reflection face, so as to return them, at least partially, into said at least one optical guide;
wherein said orientation device comprises catadioptric reflecting patterns.

17. The lighting and/or signalling device according to claim 16, wherein said orientation device for the light rays is arranged in such a manner as to return a light ray propagating in a given first direction, in a given second direction.

18. The lighting and/or signalling device according to claim 16, wherein said orientation device comprises reflecting patterns.

19. The lighting and/or signalling device according to claim 16, wherein said orientation device comprises a spatial repetition of the reflecting patterns.

20. The lighting and/or signalling device according to claim 16, wherein said reflecting patterns are obtained by deposition of a layer of reflecting material on patterns.

* * * * *